(12) United States Patent
Kawamura et al.

(10) Patent No.: US 8,691,128 B2
(45) Date of Patent: Apr. 8, 2014

(54) EXPANSION INJECTION MOLDING PROCESS AND MOLD FOR EXPANSION INJECTION MOLDING

(75) Inventors: Tatsuji Kawamura, Ichihara (JP); Akinori Nagano, Bungsue Bangkok (TH)

(73) Assignee: Prime Polymer Co., Ltd, Tokyo (JP)

( * ) Notice: Subject to any disclaimer, the term of this patent is extended or adjusted under 35 U.S.C. 154(b) by 1021 days.

(21) Appl. No.: 11/718,945

(22) PCT Filed: Nov. 8, 2005

(86) PCT No.: PCT/JP2005/020480
§ 371 (c)(1),
(2), (4) Date: May 9, 2007

(87) PCT Pub. No.: WO2006/051794
PCT Pub. Date: May 18, 2006

(65) Prior Publication Data
US 2009/0140447 A1    Jun. 4, 2009

(30) Foreign Application Priority Data
Nov. 9, 2004    (JP) .................................. 2004-324898

(51) Int. Cl.
*B29C 44/10*    (2006.01)
(52) U.S. Cl.
USPC ............... 264/51; 264/54; 264/299; 264/319; 264/325; 425/546; 425/4 R
(58) Field of Classification Search
USPC .................. 264/51, 328.1, 54, 299, 319, 325; 425/546, 4 R
See application file for complete search history.

(56) References Cited

U.S. PATENT DOCUMENTS

| 4,133,858 A | 1/1979 | Hayakawa et al. |
| 4,153,231 A | 5/1979 | Hayakawa et al. |

FOREIGN PATENT DOCUMENTS

| EP | 1162051 | 12/2001 |
| EP | 1243397 | 9/2002 |

(Continued)

OTHER PUBLICATIONS

International Search Report for PCT/JP2005/020480 dated Feb. 7, 2006.

(Continued)

*Primary Examiner* — Matthew Daniels
*Assistant Examiner* — Saeed Huda
(74) *Attorney, Agent, or Firm* — Rankin, Hill & Clark LLP (57) ABSTRACT

To provide an expansion injection molding process, which is freed from the occurrence of swirl marks on the surface of a molded article and by which foamed injection moldings having good appearance can be produced in a short molding cycle and at a low cost; and a mold for expansion injection molding. A movable mold 2 is moved toward a fixed mold 1, whereby a sealing member 6 set on at least one of a pair of facing surfaces of the mold 1 and mold 2 in the outside of a cavity is brought into contact with the other of the facing surfaces or a sealing member 6 set thereon to make the cavity 3 gas-sealed state. While keeping the gas-sealed state, the movable mold 2 is further moved toward the fixed mold 1 with the sealing member 6 compressed, whereby the volume of the cavity 3 is decreased to enhance the pressure in the cavity 3 to a level exceeding the atmospheric pressure. Then, a thermoplastic resin is injected into the cavity 3 of an enhanced pressure.

14 Claims, 6 Drawing Sheets

(56) References Cited

FOREIGN PATENT DOCUMENTS

| | | |
|---|---|---|
| JP | 59-227425 | 12/1984 |
| JP | 05-269778 | 10/1993 |
| JP | 6-198668 | 7/1994 |
| JP | 11-277575 | 10/1999 |
| JP | 2002-120252 | 4/2002 |
| JP | 2002-307482 | * 10/2002 |
| JP | 2003-334846 | 11/2003 |
| JP | 2004-009650 | 1/2004 |
| JP | 2004-9650 A * | 1/2004 |
| JP | 2004-167777 | 6/2004 |
| JP | 2005-007818 | 1/2005 |
| JP | 2005-238726 | 9/2005 |

OTHER PUBLICATIONS

Japanese Office Action corresponding to application No. 2005-323997 dated Oct. 25, 2011.
Extended European Search Report Date Nov. 14, 2011.

* cited by examiner

EXPANSION INJECTION MOLDING PROCESS AND MOLD FOR EXPANSION INJECTION MOLDING

TECHNICAL FIELD

The present invention relates to an expansion injection molding process comprising injecting a thermoplastic resin, which has been plasticated and in which expanding gas has been dissolved, into a cavity of a molding machine, and then enlarging the space of the cavity, thereby obtaining an expanded molded article. The invention also relates to a mold for expansion injection molding, the mold being to be used in the foregoing process.

BACKGROUND ART

In the field of injection molding using thermoplastic resin, it has heretofore been studied to perform expansion for the purposes of material saving, weight reduction, etc. As a method of conducting such expansion injection molding, a method is known which comprises use of a so-called "shear edge" mold designed so that a concave mold fits with a convex mold to form a cavity thereinside and the molds are caused to slide at their fitting portion to change the volume of the cavity; in the method, resin is injected into the cavity of the molding machine and then the volume of the cavity is enlarged. According to this method, it is possible to achieve an increased expansion ratio to exert an enhanced weight reduction effect.

In the above-mentioned expansion injection molding process, however, the external surface of an expansion molded article will have a great amount of defect in appearance, called swirl mark, which appears when expanding gas dissolved in molten resin breaks and the part is drawn. Therefore, such articles could not be used as practical products required having good appearance.

As a method for improving such swirl marks, Patent Document 1 discloses a technique where a thermoplastic resin containing an expansion agent is plasticated and then injected and charged into a cavity and subsequently the cavity volume is enlarged. Even in this method, however, it is difficult to retain the pressure of resin charged when the injection speed decreases at a flow front or at a section where the shape of a molded article changes greatly; and it was impossible to completely suppress the occurrence of swirl marks in the external surface of a molded article.

On the other hand, as another method for improving swirl marks, a so-called gas counter pressure method is known in which a resin containing an expansion agent is injected into a cavity in a mold, which has been pressurized with gas. However, as shown, for example, in Patent Document 2, the gas pressure of counter pressure generally requires a compression force of 1 MPa or more and airtightness of a mold is required. Therefore, the cost of molds was high. Moreover, in order to add such a high pressure to the inside of a mold, it takes time to increase the pressure of the gas in the cavity itself and therefore a cycle time itself is also long. This is a major factor of high product costs.

As a molding method solving this problem, Patent Document 3 proposes a technique in which airtight sealing is omitted by means of reduction in gas pressure. This method, however, is one conducting expansion of a level where shrinkage and warpage are prevented. It is slight expansion molding where a reduced amount of expansion agent is blended into resin and the expansion ratio is controlled to be about 1.0 to 1.2. For this reason, it cannot be used in expansion molding in which the cavity volume is enlarged to increase the expansion ratio. Moreover, the pressure of the gas in a cavity is successfully increased for a moment by such a method using no sealing. However, the increase continues only for a moment and it was impossible to keep the pressure during injection.

In conventional counter pressure molding, a time for supplying gas is required after forming a cavity between a fixed mold and a movable mold by moving the movable mold. Therefore, there are limits in speeding up of the molding process.

As conventional counter pressure molding, a method is known in which charging and discharging of counter pressure gas into and from a cavity through a gap of a parting portion in the periphery of the cavity is conducted in a non-shear edge type mold system where a fixed mold and a movable mold abut together. In such a mold, however, the gap of a parting portion is designed to be narrow in order to prevent leakage of molten resin. A large flow resistance is produced when gas passes through the parting portion when the gas is charged into and discharged from the cavity and, therefore, there are limits in speeding up of the charging and discharging of gas.

In particular, in order to increase the pressure in a cavity, it is necessary to supply compressed gas with a pressure not lower than the atmospheric pressure through a pipe after closing the mold. Therefore, the time for increasing the gas pressure in the cavity makes the molding cycle longer and a controlling device for controlling the suction and discharge of gas must be provided externally.

In injection molding, the molding cycle is one of the factors having a very important effect on cost. In conventional methods, a step of supplying gas into a cavity to increase the pressure after closing a mold is added. For this reason, the above-mentioned counter pressure method, which makes the molding cycle longer, is difficult to be adopted.

As a technique for improving the above-mentioned problems, Patent Document 4 proposes a technique in which a fixed mold and a movable mold having a shear edge structure are used and the pressure is increased simultaneously by utilizing mold closing.

Patent Document 1: Japanese Patent Application Laid-Open No. 2002-120252

Patent Document 2: Japanese Examined Patent Application No. H1-22132

Patent Document 3: Japanese Patent Application Laid-Open No. H5-269778

Patent Document 4: Japanese Patent Application Laid-Open No. H11-277575

DISCLOSURE OF THE INVENTION

Problems to be Solved by the Invention

In the mold of Patent Document 4, however, a gas-sealed part is formed by providing an O-ring on a fitting surface where the fixed mold and the movable mold slide. For this reason, the O-ring is abraded at every opening and closing to result in decrease of airtightness and, therefore, complicated replacement operation of O-rings is required.

Moreover, for example, in the case where a molded article is in a quadrangular shape, if there is a difference in the gap at positions of the fitting surface, air leakage tends to occur at positions where the gap is wide because an O-ring has a fixed thickness.

An object of the present invention is to provide an expansion injection molding process by which the occurrence of swirl marks on the surface of a molded article in expansion molding can be prevented and by which expansion injection molded articles having good appearance can be produced in a short molding cycle at a low cost; and a mold for expansion injection molding.

Another object of the present invention is to provide an expansion injection molding process and a mold for expansion injection molding where air leakage does not occur when the gas pressure in a cavity is increased and which can suppress the wear of a sealing member for maintaining airtightness.

Means for Solving the Problem

An expansion injection molding process of the present invention is an expansion injection molding process comprising charging a thermoplastic resin which has been plasticated and contains expanding gas dissolved therein into a cavity defined by a fixed mold and a movable mold, and then moving the movable mold to enlarge the volume of the cavity to obtain expanded resin molded article, wherein the movable mold is moved toward the fixed mold, thereby a sealing member arranged on at least one of a pair of facing surfaces facing each other outside the cavity of the fixed mold and movable mold is brought into contact with the other facing surface or a sealing member arranged thereon, thereby the cavity is brought into a gas-sealed state;

thereafter, the movable mold is moved further toward the fixed mold while the sealing member is compressed, thereby the volume of the cavity is reduced while the gas-sealed state is maintained, thereby the pressure in the cavity is increased to a pressure higher than the atmospheric pressure; and thermoplastic resin is injected into the cavity in which the pressure has been increased.

In the invention indicated above, a sealing member arranged on a pair of facing surfaces facing each other outside the cavity of the fixed mold and movable mold is brought into contact with the other facing surface or a sealing member arranged thereon, and thereby the cavity is brought into a gas-sealed state. Thereafter, the movable mold is moved further toward the fixed mold while the sealing member is compressed, and thereby the volume of the cavity space is reduced while the gas-sealed state is maintained. Thereby, the pressure in the cavity is increased to a pressure higher than the atmospheric pressure. Therefore, the closure of the mold and the increase of the pressure of the gas in the cavity are performed simultaneously. It, therefore, is possible to shorten the time to apply counter pressure and also to produce a swirl mark-free expansion injection molded article having good appearance in a short molding cycle.

The expansion injection molding process of the present invention is characterized in that during or after the injection of the thermoplastic resin into the cavity in which the pressure has been increased to the pressure higher than the atmospheric pressure, the gas pressure in the cavity is released, and thereafter the movable mold is moved apart from the fixed mold, whereby the cavity volume is enlarged, and whereby the thermoplastic resin in the cavity is expanded.

By reducing the pressure by discharging the gas in the cavity before enlarging the volume of the cavity, a solidified layer is formed in a surface layer of the resin charged in the cavity. When the volume of the cavity space is enlarged after the formation of the solidified layer, an unsolidified layer in the resin charged expands and, as a result, it is possible to obtain a swirl mark-free expansion molded article having good appearance.

The expansion injection molding process of the present invention is characterized in that a fixed mold and a movable mold are used which have a shear edge structure such that a concave part and a convex part are engaged together to form therein a cavity and the concave part and the convex part are caused to slide at an fitting portion to change the volume of the cavity.

In the invention indicated above, it is also permitted that after the sealing member arranged on at least one of the pair of facing surfaces and the other facing surface or the sealing member arranged thereon are brought into contact together, a gas is supplied into the cavity through a gas passageway interconnecting a gap between a gas-sealed part sealed with the sealing member and the fitting portion of the shear edge structure, whereby the pressure in the cavity space is increased.

It is preferable that during or after the injection of the thermoplastic resin into the cavity space in which the pressure has been increased to the pressure higher than the atmospheric pressure, the gas pressure in the cavity space is released by discharging the gas in the cavity through a gas passageway interconnecting a gap between a gas-sealed part sealed with the sealing member and the fitting portion of the shear edge structure.

When a mold is used in which a shear edge structure as described above is designed for the periphery of a cavity, gas can be charged into and discharged from the cavity through the entire periphery of a molded article and, therefore, it becomes possible to increase and decrease the pressure of the gas in the cavity at a high rate. It, therefore, is possible to produce a swirl mark-free expansion injection molded article having good appearance in a short molding cycle.

Moreover, because the sealing member is arranged on the facing surface outside the cavity of the fixed mold and/or the movable mold, the air does not leak through the gas-sealed part even when the gap between the fitting surfaces differs at different positions. Furthermore, because the sealing member does not slide in contact with a mold surface during the opening and closing of the mold, wear of the sealing member can be suppressed.

In cases where the gas pressure in the cavity must be higher, for example, a case of high-pressure physical foaming in which an expansion agent in supercritical condition is supplied, it is permitted to supply external pressurized gas into the cavity through the gas passageway and the shear edge when increasing the gas pressure in the cavity. Also in this case, the preliminary pressure increase by mold closure enables the pressure increase in a shorter period of time.

Further, by reducing the pressure by discharging the gas in the cavity before enlarging the volume of the cavity, a solidified layer is formed in a surface layer of the resin filled in the cavity. When the volume of the cavity space is enlarged after the formation of the solidified layer, an unsolidified layer in the resin charged expands and, as a result, it is possible to obtain a swirl mark-free expansion molded article having good appearance.

In each of the inventions described above, it is preferable that a chemical expansion agent is used as the expansion agent for the thermoplastic resin, and the movable mold is moved toward the fixed mold while the sealing member is compressed, whereby the gas pressure in the cavity is increased to 0.05 MPa or higher.

It is also preferable that a physical expansion agent is used as the expansion agent for the thermoplastic resin, and the movable mold is moved toward the fixed mold while the sealing member is compressed, whereby the gas pressure in the cavity is increased to a pressure as high as 5% or more of the supply pressure of the physical expansion agent.

The mold for expansion injection molding of the present invention is a mold for expansion injection molding with which an expanded resin molded article is obtained by charging a thermoplastic resin which has been plasticated and contains expanding gas dissolved therein into a cavity defined by a fixed mold and a movable mold and then the movable mold is moved to enlarge the volume of the cavity, wherein the mold is characterized in that the fixed mold and the movable mold each have, outside the cavity, a pair of surfaces facing each other; a sealing member is arranged on at least one of the pair of facing surfaces; the movable mold is moved toward the fixed mold, whereby the cavity is brought into a gas-sealed state when the sealing member arranged on one of the facing surfaces comes into contact with the other facing surface or a sealing member arranged thereon; the movable mold is moved further toward the fixed of mold while the sealing member is compressed, whereby the volume of the cavity is reduced while the gas-sealed state is maintained, whereby the pressure in the cavity is increased to a pressure higher than the atmospheric pressure.

In the invention indicated above, a sealing member arranged on a pair of facing surfaces facing each other outside the cavity of the fixed mold and movable mold is brought into contact with the other facing surface or a sealing member arranged thereon, whereby the cavity is brought into a gas-sealed state. Thereafter, the movable mold is moved further toward the fixed mold while the sealing member is compressed by contact, whereby the volume of the cavity space is reduced while the gas-sealed state is maintained. Thereby, the pressure in the cavity is increased to a pressure higher than the atmospheric pressure. Therefore, the closure of the mold and the increase of the pressure of the gas in the cavity are performed simultaneously. It, therefore, is possible to shorten the time to apply counter pressure and also to produce a swirl mark-free expansion injection molded article having good appearance in a short molding cycle.

The mold for expansion injection molding of the present invention is characterized in that the fixed mold and the movable mold have a shear edge structure such that a concave part and a convex part are fitted together to form therein a cavity and the concave part and the convex part are caused to slide at an fitting portion to change the volume of the cavity.

In the invention mentioned above, it is preferable that the maximum cavity thickness at which the sealing member arranged on the one of the pair of facing surfaces and the other facing surface or the sealing member arranged thereon contact is from 2 to 8 mm and that the cavity thickness at which a thermoplastic resin is charged into the cavity is from 0.7 to 2.5 mm.

In the invention mentioned above, it is preferable that a gas passageway for supplying and discharging gas, which is interconnecting the gas-sealed part sealed with the sealing member and the fitting portion of the shear edge structure, is provided.

When a mold is used in which a shear edge structure is designed for the periphery of a cavity as described above, gas can be charged into and discharged from the cavity through the entire periphery of a molded article and, therefore, it becomes possible to increase and decrease the pressure of the gas in the cavity at a high rate. It, therefore, is possible to produce a swirl mark-free expansion injection molded article having good appearance in a short molding cycle.

Moreover, because the sealing member is arranged on the facing surface outside the cavity of the fixed mold and/or the movable mold, the air does not leak through the gas-sealed part even when the gap between the fitting surfaces differs at different positions. Furthermore, because the sealing member does not slide in contact with a mold surface during the opening and closing of the mold, wear of the sealing member can be suppressed.

Moreover, by providing the above-mentioned gas passageway for charging and discharging gas, it is possible to supply external pressurized gas into the cavity through the gas passageway and the shear edge at the time of increasing the gas pressure in the cavity, in cases where the gas pressure in the cavity must be higher, for example, a case of high-pressure physical foaming in which a expansion agent in supercritical condition is supplied. Also in this case, the preliminary pressure increase by mold closure enables the pressure increase in a shorter period of time.

By reducing the pressure by discharging the gas in the cavity through the gas passageway before enlarging the volume of the cavity, a solidified layer is formed in a surface layer of the resin filled in the cavity. When the volume of the cavity space is enlarged after the formation of the solidified layer, an unsolidified layer in the resin charged expands and, as a result, it is possible to obtain a swirl mark-free expansion molded article having good appearance.

In the invention mentioned above, a slide core, which is arranged so as to face a space between the gas-sealed part sealed with the sealing member and the fitting portion of the shear edge structure and the volume of the space is hermetically changed through sliding of the slide core in a certain definite way, can be provided and the gas pressure in the cavity in the sealed state can be increased through the movement of the slide core.

When a slide core is provided as described above, it is possible to further increase the gas pressure in a cavity by moving the slide core forward after bringing the cavity into a gas-sealed state in cases where it is necessary to make the gas pressure in the cavity higher.

In the invention mentioned above, it is preferable that one of the fixed mold and the movable mold has a mold body and an insert, wherein the insert is capable of being attached to and detached from the mold body, the thickness of the insert defines the cavity thickness, and one of the paired faces of the insert constitutes the facing surface.

By making the gas-sealed part formed between the fixed mold and the movable mold an insert structure and replacing the insert with others having different thickness depending on the desired cavity thickness in order to adjust the thickness of the cavity, it is possible to adjust the thickness of the cavity.

Effect of the Invention

According to the present invention, the occurrence of swirl marks on the surface of a molded article is prevented and it is possible to obtain expansion injection-molded articles having good appearance in a short molding cycle at a low cost.

Moreover, according to the present invention, air leakage does not occur because a sealing member arranged on one facing surface come into firm contact with the other facing surface or a sealing member arranged thereon at its entire circumference when the gas pressure in the cavity is increased. Furthermore, wear of the sealing members for maintaining airtightness is suppressed.

BEST MODE FOR CARRYING OUT THE INVENTION

Figure 1:
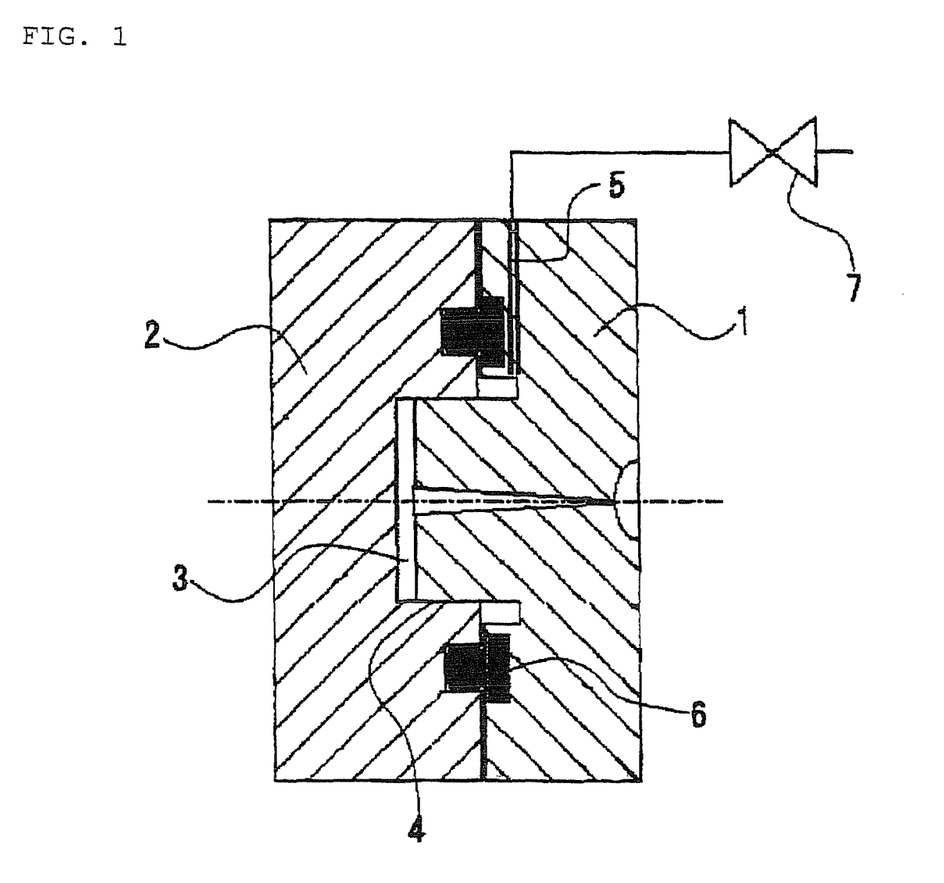
FIG. 1 is a cross sectional view showing one embodiment in the mold for expansion injection molding of the present invention.
Figure 2:
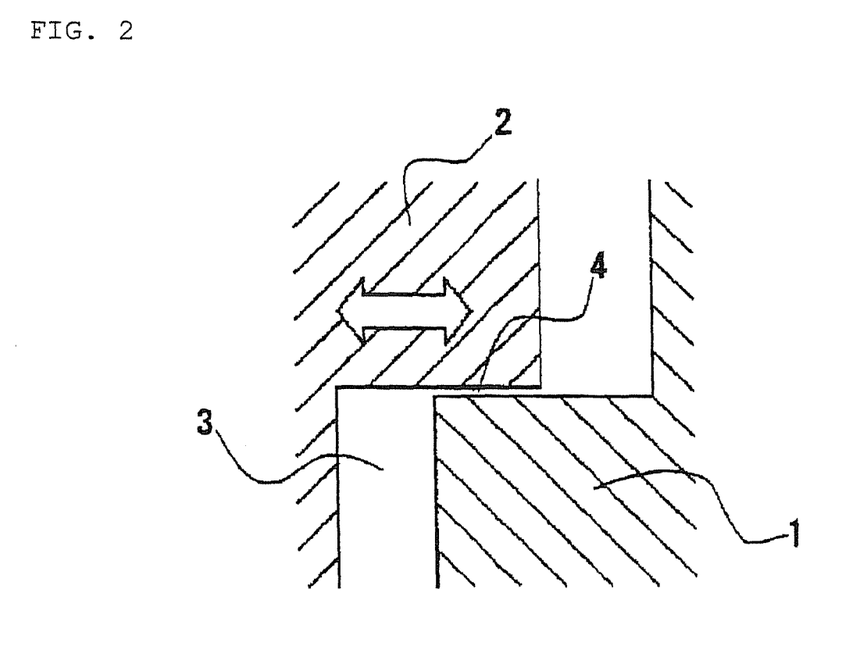
FIG. 2 is a partial sectional view in which the shear edge of the mold of FIG. 1 and its surrounding are enlarged.

The present invention is described below with reference to the accompanying drawings. FIG. 1 is a sectional view showing one embodiment of the mold for expansion injection molding of the present invention. FIG. 2 is a partial sectional view in which the shear edge and its surrounding are enlarged.

As shown in FIG. 1, the mold for expansion injection molding of this embodiment is provided with a fixed mold 1 (core mold) having a convex part and a movable mold 2 (cavity mold) having a concave part, which is configured to engage with the convex part of the fixed mold 1.

It is designed so that a cavity 3 is formed in an internal space defined by the fixed mold 1 and the movable mold 2 fitted thereto and the volume of the cavity 3 is changed when the concave part and a convex part are caused to slide together at a shear edge 4, which is their fitting portion.

The fixed mold 1 and the movable mold 2 have a pair of facing surfaces facing each other outside the cavity space 3. A sealing member 6 is arranged on each of the facing surfaces.

A gas passageway 5 extending from the inside of the fixed mold 1 to the outside thereof communicates between the gas-sealed part sealed with the sealing members 6 and the shear edge 4. In the outside of the fixed mold 1, the gas passageway 5 is provided with a valve 8.

Gas can be charged into and discharged from the cavity 3 through the shear edge 4 by opening the valve 8.

A molding process using the mold for expansion injection molding of this embodiment is explained with reference to FIGS. 3 and 4. From a state of FIG. 3(a) where the fixed mold 1 and the movable mold 2 are apart from each other, the movable mold 1 is moved toward the fixed mold 2, so that the sealing member 6 arranged on the facing surface of the movable mold 1 and the sealing member 6 arranged on the facing surface of the fixed mold 2 are brought into contact. The cavity is thereby put in a gas-sealed state as shown in FIG. 3(b).

Figure 3:
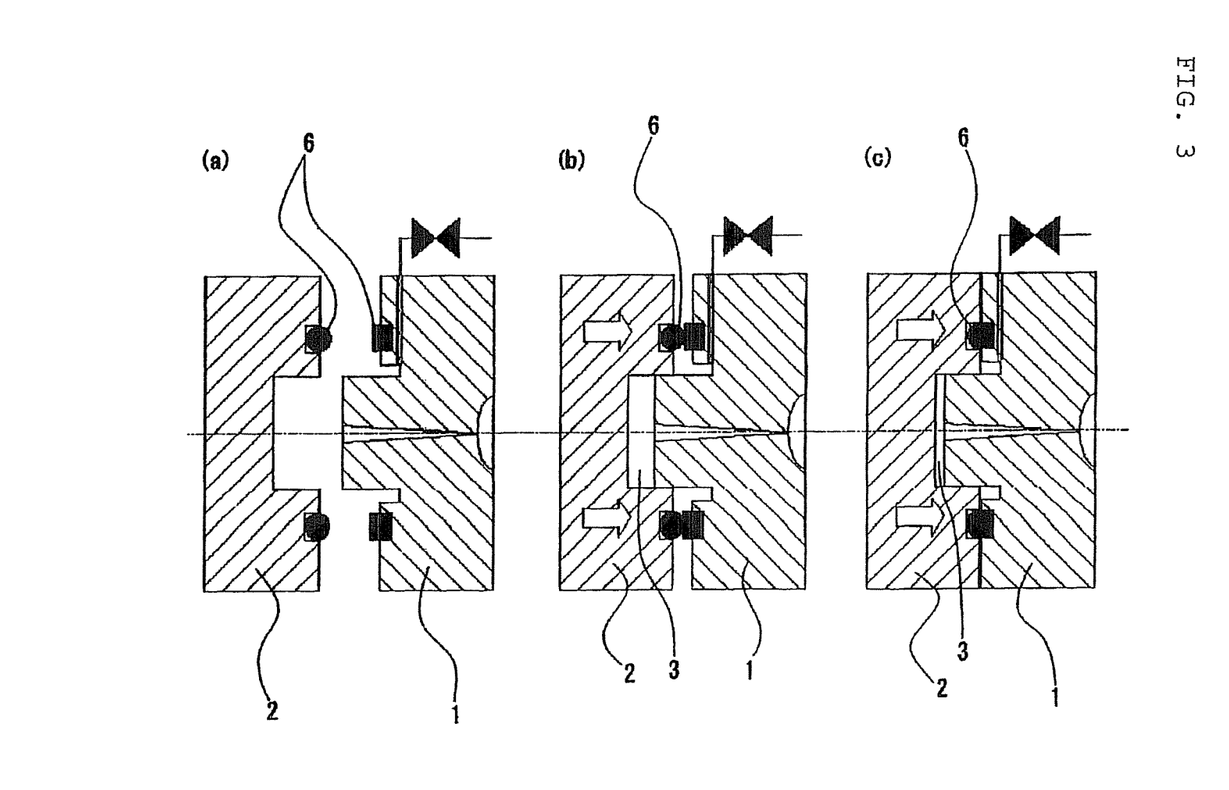
FIG. 3 is a sectional view describing the molding process using the mold for expansion injection molding of FIG. 1.

Subsequently, as shown in FIG. 3(c), the movable mold 2 is moved further toward the fixed mold 1 while the sealing member 6 arranged on the facing surface of the movable mold 1 and the sealing member 6 arranged on the facing surface of the fixed mold 2 are pressed in contact; the volume of the cavity 3 is thereby reduced while the gas-sealed state is maintained. The pressure in the cavity 3 is thereby increased to a pressure higher than the atmospheric pressure.

When the mold closure of the injection molding machine and the sealing of the gas in the cavity are carried out and the mold closure is further proceeded as described above, the cavity volume is reduced and the gas pressure is increased. Because the increasing of the pressure in the cavity is completed at the completion of the mold closure, it is possible to immediately start an operation of injecting molten resin.

Figure 4:
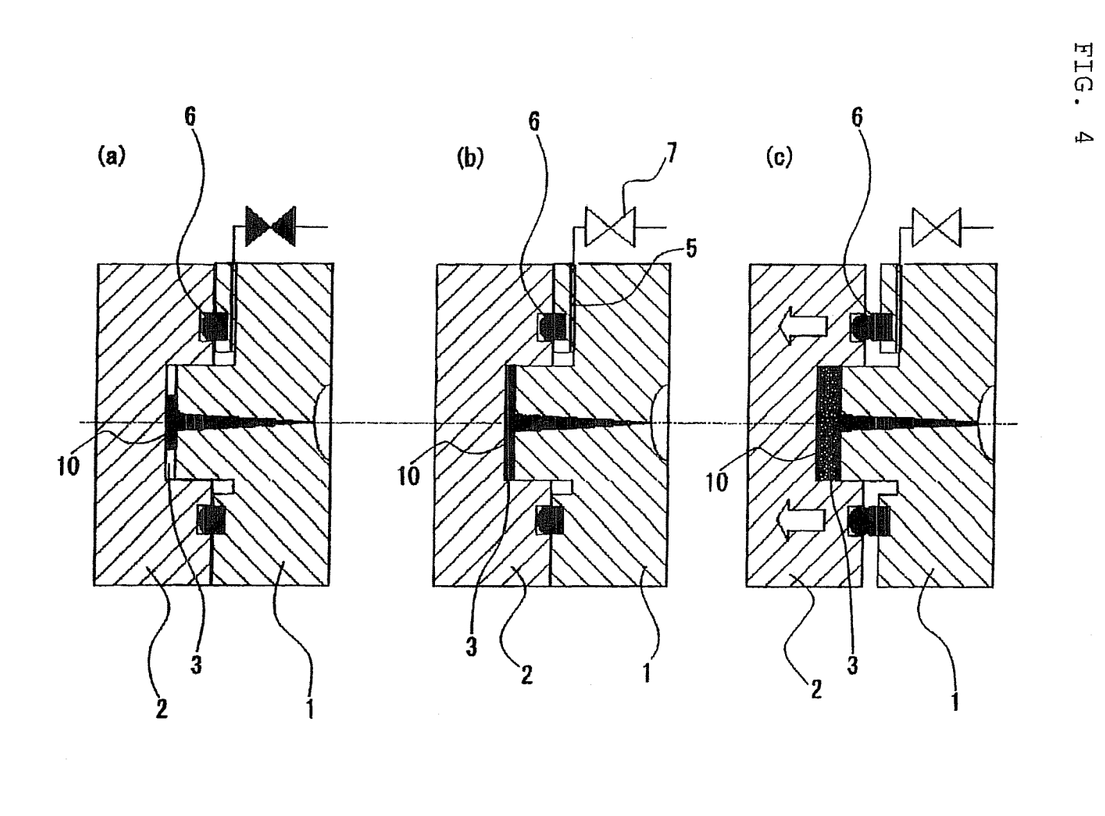
FIG. 4 is a sectional view describing the molding process using the mold for expansion injection molding of FIG. 1.

After the gas pressure in the cavity 3 is increased as described above, a thermoplastic resin 10, which has been plasticated and which contains expanding gas dissolved therein, is injected and charged into the cavity 3 through the inside of the fixed mold 2 as shown in FIG. 4(a).

As shown in FIG. 4(b), after or during the charging of the thermoplastic resin 10 into the cavity 3, the valve 8 is opened and the gas in the cavity 3 is discharged from the gas passageway 5 through the shear edge 4. A solidified layer is thereby formed in the surface of the thermoplastic resin 10 filled in the cavity 3.

Then, as shown in FIG. 4(c), the movable mold is moved, so that the volume of the cavity 3 is enlarged and an unsolidified layer in the resin charged is expanded. Thus, an expansion molded article is obtained.

The resin used for molding in the present invention is not particularly limited as long as it is thermoplastic, but polyolefin resin is preferable and, particularly, polypropylene resin is preferred.

In the present invention, so-called physical expansion agents, such as carbon dioxide gas and nitrogen, may be used as foaming gas. Gas may also be used which results from thermal decomposition of so-called chemical expansion agents, such as sodium hydrogencarbonate and citric acid. Physical expansion agents are usually dissolved into plasticized thermoplastic resin in an injection molding machine. Chemical expansion agents are usually used after being blended in the form of masterbatch with pelletized raw material, and kneading gas generated on heating with plasticated resin to dissolve the gas into the resin.

In the present invention, the shear edge 4 has a gap wider than that of partings of conventional abutting system. For example, it has a gap of from 0.01 to 0.10 mm. Therefore, the resistance exerted during gas flow is small and it is possible to reduce the time for charging and discharging gas in the cavity through the shear edge.

The shear edge is so structured that molten resin charged in the cavity does not leak out of the cavity even when the mold is opened for the purpose of enlarging the volume of the cavity in an expansion step.

In the present invention, the fixed mold and the movable mold have, in the outside of the cavity, more specifically the side of the outer periphery of the shear edge, a pair of facing surfaces facing each other; on at least one of the facing surfaces is arranged a sealing member which constitutes a gas-sealed part. Such a sealing member is preferably arranged on each of the facing surfaces.

Such arrangement in which a gas-sealed part is formed outside the periphery of the shear edge makes gas sealing of the cavity be conducted during closure of the mold and makes it possible to increase the gas pressure in the cavity by the action of mold closing. It is configured that the gas pressure in the cavity increases with mold closure and at the same time the sealing pressure increases with mold closure.

Regarding the configuration of the gas-sealed part, when the gas pressure in the cavity is low, an elastic member such as rubber may be arranged as the sealing member on the facing surface of one of the fixed mold and the movable mold. In order to obtain a higher pressure as the gas pressure in the cavity, it is desirable to provide an elastic member on the facing surface of both of the fixed mold and the movable mold. This makes it possible to achieve much more sealing strokes and, therefore, it is possible to increase the gas pressure in the cavity to a high pressure.

Specific examples of the material of the sealing member include nitrile rubber, fluororubber, urethane rubber, silicone rubber, chloroprene rubber, Hypalon rubber, butyl rubber, ethylene-propylene rubber, natural rubber and sponge rubber and the like.

The shape of the sealing member is not particularly limited and may be in a form of round cord, angular cord, plate, tube, hose, etc. However, a shape such that a surface contact is established between a mold surface and the sealing member by compression due to mold closure is preferred.

When the sealing member is in a form with a circular or semicircular cross section, like a round cord, tube, half-circle and the like, the compression width is wide and it is possible to acquire a long sealing stroke.

When the sealing member is in a form with a plane, like angular cord, plate and the like, it is possible to seal securely because it comes into surface contact with the mold surface or sealing member which it faces.

In order to make the most of both the advantages mentioned above, it is preferable to use a sealing member whose one side is in a round shape and the other side is in a angular shape.

During the process of sealing and pressure-increasing of the gas in a cavity, it is preferable to increase the gas pressure in the cavity by starting the sealing by bringing a sealing member arranged on one facing surface into contact with the other facing surface or a sealing member arranged thereon at the time when the cavity thickness becomes 2 to 8 mm, continue the mold closure while keeping hermetical seal, and compress the sealing member until the final cavity thickness becomes 0.7 to 2.5 mm.

The amount of increase in the gas pressure in the cavity during this operation, which may vary depending on the accuracy of the mold and the arrangement of the gas-sealed part, is basically determined on the basis of the ratio of the sealed volume at the start of sealing to that at the completion of the sealing.

When the gas is sealed only at the outer periphery of the shear edge, however, it is difficult to obtain a gas pressure in the cavity of about 0 to 0.5 MPa or more. When a further increase in pressure is required, it is desirable to conduct the pressure increase by supplying gas from the outside to the inside of the gas-sealed part or by moving a slide core forward into the gas passageway or gas pocket provided around the cavity.

Figure 5:
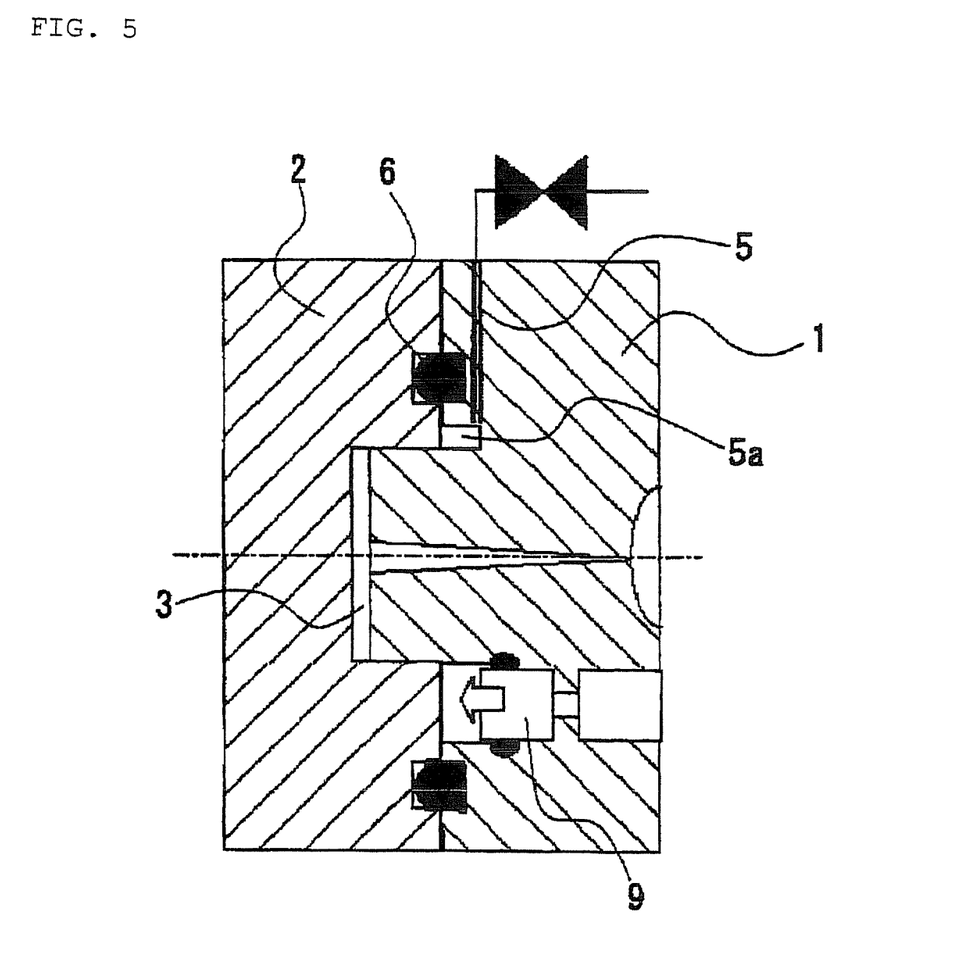
FIG. 5 is a sectional view of a mold for expansion injection molding of the present invention provided with a slide core.

FIG. 5 is a sectional view of an expansion injection molding apparatus of the present invention provided with a slide core. The slide core 9 is arranged to face a space between the gas-sealed part by the sealing member 6 and the shear edge 4, such as the gas passageway 5, e.g. the looped gas passageway 5a which is arranged in the outer periphery of the base end of the convex part in the fixed mold 1 and serves also as a gas pocket space. This changes the volume of the space airtightly through its slide in a certain direction. The mold is closed while the slide core 9 is kept returned and the slide core 9 is moved forward into the space after the completion of sealing. Thus, the gas pressure in the gas passageway and the cavity is increased.

When the increasing of the pressure of the gas in the cavity with the use of the slide core is combined with the increasing thereof by mold closure, the molding cycle may be elongated. However, a substantial molding cycle time is influenced little because the movement of the slide core itself is finished in a short period of time.

Figure 6:
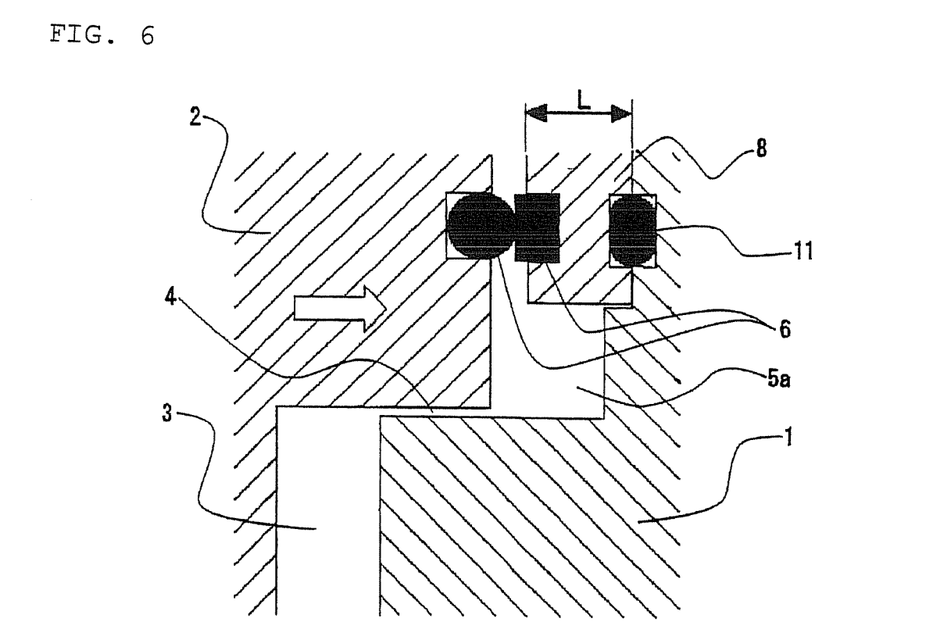
FIG. 6 is a partial sectional view of a mold for expansion injection molding of the present invention provided with an insert.

By making the gas-sealed part formed between the fixed mold and the movable mold an insert structure and changing the thickness thereof in order to adjust the thickness of the cavity, it is possible to adjust the thickness of the cavity. FIG. 6 is a partial sectional view of a mold for expansion injection molding of the present invention provided with an insert. The gap between this insert 8 and the fixed mold 1 is sealed by means of arrangement of an O-ring 11 or the like. For example, by changing the length of L shown in FIG. 8, namely, the thickness of the insert 8, it is possible to change the cavity thickness at the time of completion of sealing and that at the time of completion of mold closure.

As shown in FIG. 6, in the outer periphery of the base end of the convex part in the fixed mold 1, a looped gas passageway 5a may be provided whose width is defined by the gap between the convex part and the insert 8 and whose height is defined by the thickness of the insert 8. The entire loop of this gas passageway 5a is interconnected to the cavity 3 through the gap of the shear edge.

Regarding adjustment of the clamping force to the mold and adjustment of the thickness of the cavity, they can be changed by means of abutment of the gas-sealed part or a spacer provided to the mold itself, or both.

In the present invention, after the gas pressure in the cavity is increased, the gas pressure in the cavity starts to further increase as the cavity is filled with molten resin by injection operation. Due to the structure where the gas in the cavity flows through the shear edge into the gas passageway provided in the outer periphery of the shear edge as shown in FIG. 5 and FIG. 6, substantial increase in the cavity pressure is suppressed and, therefore, burning, which may cause problems in high-speed injection molding, does not occur. Burning referred to herein means that resin undergoes thermal degradation, such as carbonization, due to excessive increase in temperature caused by pressure increase. In other words, the gas in the cavity is discharged through the shear edge using, as a buffer, the gas passageway 5a arranged around the cavity during charging of resin. This allows the gas to go out smoothly. It therefore is possible to prevent occurrence of burning due to compression of the gas in the cavity and pockmarks in the surface of a molded article, which tend to cause problems in expansion molding.

Further, by reducing the pressure by discharging the gas in the cavity before completing the charging of molten resin into the cavity or after completing the charging but before starting enlargement of the inner volume of the cavity (that is, so called core backing), a solidified layer is formed in the surface layer of the resin charged in the cavity. This makes it possible to expand the unsolidified layer in the resin charged with core backing to obtain an expansion molded article.

The timing of discharging the gas in the cavity to release the pressure must be before starting enlarging the cavity volume. The release of the pressure is conducted preferably at a time between a time when the remaining screw stroke becomes 30% of that at the time of charging molten resin and a time when the enlarging of the cavity volume is started, and more preferably a time between a time of completion of charging molten resin and a time when the enlarging of the cavity volume is started.

In particular, when the discharging of gas is conducted during the charging of molten resin into a cavity, there is an influence of the rate of discharging the gas in the cavity and the rate of injecting molten resin. It is desirable that the gas discharging is conducted earlier when the charging rate is high or the gas discharging rate is low, and that the gas discharging is conducted later when the charging rate is low or the gas discharging rate is high. Moreover, by arranging a gas passageway 5a, like that explained in FIG. 5 and FIG. 6, which is provided in a loop shape around the cavity on the side of the base end of the convex part of the fixed mold and wherein gas is charged into and discharged from the cavity through a shear edge, time variation of the timing is somewhat permitted.

The pressure in the cavity at the time of increasing the pressure must be a pressure at which the gas contained in the resin generates bubbles but the bubbles do not burst. In a system where a chemical expansion agent is used, the pressure is preferably 0.05 MPa or more, more preferably from 0.05 to 0.8 MPa, and even more preferably from 0.1 to 0.5 MPa. In this specification, the pressure in a cavity indicates the increase relative to the atmospheric pressure.

In a system where a physical expansion agent such as carbon dioxide gas and nitrogen gas is used, a range of 5% or more of the gas charging pressure, preferably a range of from 5 to 50%, and even more preferably a range of from 10 to 40% is a region where the appearance becomes good.

If the gas pressure in a cavity is low, swirl marks do not disappear completely. If the gas pressure in the cavity is high, the gas in the cavity is not discharged completely and therefore pockmarks (unevenness due to gas pockets) in the surface of a molded article or undulation of the surface may appear.

The gas pressure at increasing pressure is suitably set according to molding conditions, such as injection speed and cavity thickness. There is a tendency that a higher injection speed or a smaller cavity thickness provides a better appearance at a lower gas pressure.

As the gas charged in a cavity, any gas may be used if it does not burst the gas dissolved in resin. Specific examples include inert gas such as air, carbon dioxide and nitrogen.

In the present invention, external pressurized gas may be supplied into the cavity from the gas passageway 5 shown in FIG. 1 previously mentioned through the shear edge at the time of increasing the gas pressure in the cavity. Also in this case, because the pressure increase by mold closure is conducted, it is possible to increase the pressure in a shorter period of time in comparison to the case of using only pressurized gas from the outside. By supplying external pressurized gas, it is possible to increase the gas pressure in the cavity in a shorter period of time in the case where the gas pressure in the cavity must be higher, for example, even in a case of high-pressure physical foaming in which an expansion agent in supercritical condition is supplied.

In order to obtain a predetermined gas pressure in a cavity, a facility for charging and discharging gas has heretofore been required. It, however, is possible to conduct mold closing, which is carried out in injection molding, simultaneously with a pressure increasing step by using mold closing for increasing the gas pressure in a cavity as in the present invention. Therefore, the molding cycle will have no time increase caused by the time for increasing the pressure of the gas in the cavity.

Because no apparatus for controlling the increase in pressure in a cavity is required, it is possible to simplify the gas pressure control in a cavity only to a gas discharging mechanism. Increase in time is not needed for increasing or decreasing the pressure of the gas in the cavity as mentioned above. It, therefore, becomes possible to conduct counter pressure molding at low cost without making the cycle time longer.

In cases where a high gas pressure is required in a cavity, for example, in supercritical expansion using a physical expansion agent, an external gas supplying device may be added. Also in such a case, the gas in the cavity is preliminary pressurized by mold closing of the mold in the present invention. Therefore, the amount of the gas supplied from the external gas supplying device may be small and it becomes possible to reduce the time for increasing the pressure and it is possible to minimize the increase in molding cycle.

The present invention can be applied also to a normal mold having an abutment type parting line as well as molds with a shear edge structure. When the present invention is applied to a mold having an abutment type parting line, a pair of facing surfaces facing each other is provided outside the parting line of the movable mold and the fixed mold. A sealing member is arranged on at least one of these facing surfaces; the movable mold is moved toward the fixed mold and thereby the sealing member of the facing surface is brought into contact with the other facing surface or a sealing member arranged thereon. Thus, the cavity is brought into a gas-sealed state outside a parting line.

Thereafter, the movable mold is moved further toward the fixed mold while the sealing member is compressed. The volume of the sealed space is, thereby, reduced while the gas-sealed state is maintained. The pressure in the sealed space including the cavity space is, thereby, increased to a pressure higher than the atmospheric pressure and the gap at the parting line is made narrower.

Subsequently, a thermoplastic resin which has been plasticated and which contains expanding gas dissolved therein is charged into the cavity in which the pressure has been increased, and then the movable mold is moved to enlarge the volume of the cavity. Thus, an expanded resin molded article is obtained.

In the automobile field under energy saving and emission control, molded articles, which have good appearance and are light, are demanded. Some injection molded parts produced by use of the expansion molding method have begun to emerge in the market, but further improvement in appearance is still necessary. On the other hand, because the counter pressure method is accompanied by increase in the number of steps, the molding cycle will be longer and therefore this method is difficult to be adopted in the automobile field where cycle reduction in seconds is required. According to the present invention, however, increase in cycle time, which has been a problem with conventional counter pressure method, does not occur or the occurrence thereof can be minimized and light expansion molded articles with good appearance can be obtained. Therefore, further development of the expansion molding method can be expected.

EXAMPLES

The present invention will be described in more detail below with reference to Examples, but the invention is not limited to the Examples.

Example 1

A mold shown in FIG. 1, which has a cavity size of 800× 500 mm, was prepared. This mold has a structure such that the thickness of the cavity can be changed by the thickness of an insert of its gas-sealed part. Through fixation of an insert having a predetermined thickness to the movable mold across a rubber O-ring having a circular cross section, the mold was adjusted to have a cavity thickness of 1.5 mm when the mold is in a completely closed state.

The surrounding of the cavity of this mold forms a shear edge structure. In the outer periphery of the base end of the convex part in the fixed mold, a looped gas passageway having a width of 5 mm and a height of 15 mm is provided, where the width is defined by the gap between the convex part and the insert and the height is defined by the thickness of the insert. This gas passageway is interconnected to the cavity through the gap of the shear edge.

The arrangement of an O-ring on the movable mold made it possible to establish gas sealing and the arrangement of a rubber plate having a rectangular cross section on the fixed mold made it possible to achieve a long stroke at the time of sealing. The stroke for sealing the cavity can be changed by changing the thickness of the rubber plate arranged on this fixed mold.

The molding machine has a structure where carbon dioxide in a gas state, as an expansion agent, is introduced to the middle of a cylinder in which a raw resin is melted and the molten resin and the carbon dioxide are kneaded and dissolved by rotation of a screw.

The mold has a structure where molten resin is injected through three direct gates of valve gate specification. The mold was attached to an injection molding machine capable of finely adjusting the cavity clearance with a motor of the molding machine and it was set so that the mold temperature, the cooling time and the resin temperature at injection would become 40° C., 40 seconds and 195° C., respectively.

As molding materials, block polypropylenes (manufactured by Mitsui Chemicals, Inc., MFR: 35 g/10 minutes (230° C.), and MFR: 70 g/10 minutes (230° C.)) were used. Air was used as a gas in a cavity.

Due to sealing of the surrounding of the cavity, the pressure in the cavity was increased to about 0.3 MPa with mold closure. Then, a molten polypropylene resin was injected thereinto, the resin having been prepared through introduction of carbon dioxide as foaming gas at 1.5 MPa, followed by melting and dissolving. On completion of the injection, the gas pressure in the cavity was released and the movable mold was moved so that the volume of the cavity would be enlarged in 0.5 second from the completion of the injection. Thus, an expansion molded article was obtained.

It was confirmed visually that the surface of the resulting molded article was free from swirl marks and unevenness caused by defective expansion. The molding conditions and the results derived therefrom are shown in Table 1. Regarding the influence of the flow of material, there was some extent of, but small, difference in expansion properties. In addition, there was not a significant difference in appearance. The molding conditions and the results derived therefrom are shown in Table 1.

Comparative Example 1

Injection molding was carried out without application of gas pressure into the cavity (gas pressure in the cavity=0 MPa), swirl marks occurred in the surface of the molded article. Moreover, pockmarks (unevenness of the surface of the molded article) were found in a part of the surface of the molded article. The molding conditions and the results derived therefrom are shown in Table 1.

Reference Example 1

Injection molding was performed in the same manner as Example 1 except that the gas pressure in the cavity was increased up to 0.9 MPa. Some pockmarks and defective expansion were generated in the surface of the expansion molded article because the cavity pressure was higher than the pressure of the physical expansion agent, 1.5 MPa. It, however, was confirmed that there were no swirl marks. The molding conditions and the results derived therefrom are shown in Table 1.

Reference Example 2

The supply pressure of the expansion agent and the gas pressure in the cavity were equal to those used in Example 1. The pressure in the cavity was maintained also after the completion of injection of a molten resin into the cavity. Release of the pressure was started during the step of enlarging the cavity volume by moving the movable mold. Some pockmarks and defective expansion were generated in the surface of the expansion molded article because the timing of starting the gas discharge was later than a preferable range. It, however, was confirmed that there were no swirl marks. The molding conditions and the results derived therefrom are shown in Table 1.

TABLE 1

|  | Example 1 | Comparative example 1 | Reference example 1 | Reference example 2 |
|---|---|---|---|---|
| Resin | PP | PP | PP | PP |
| Expansion agent | $CO_2$ Gas | $CO_2$ Gas | $CO_2$ Gas | $CO_2$ Gas |
| Expansion agent Pressure (MPa) | 1.5 | 1.5 | 1.5 | 1.5 |
| Gas Pressure in Cavity (MPa) | 0.3 | 0.0 | 0.9 | 0.2 |

TABLE 1-continued

|  | Example 1 | Comparative example 1 | Reference example 1 | Reference example 2 |
|---|---|---|---|---|
| Timing of Gas Discharging | Completion of Injection | Completion of Injection | Completion of Injection | During Expansion Step |
| Resin Charge Thickness (mm) | 1.5 | 1.5 | 1.5 | 1.5 |
| Product Thickness (mm) | 2.5 | 2.5 | 2.5 | 2.5 |
| Evenness | Even | Uneven | Uneven | Uneven |
| Swirl Mark | Absent | Present | Absent | Absent |

Example 2

Injection molding was carried out in the same manner as Example 1 except that, as an expansion agent, sodium hydrogencarbonate and a citric acid-based thermal decomposition type chemical expansion agent were used. The chemical expansion agent was supplied in such a manner that it was added in the form of masterbatch in an amount of 3 parts to the material and then mixed.

Into a cavity where the pressure was increased to about 0.2 MPa by mold closure of the molding machine, a molten polypropylene resin was injected, the resin having been prepared by melting and dissolving carbon dioxide generated from a chemical expansion agent decomposed on heating. At the time when the injection was completed, the gas pressure in the cavity was released and the movable mold was moved so that the volume of the cavity would be enlarged in 0.5 seconds from the completion of the injection. Thus, an expansion molded article having no swirl marks in its surface was obtained. The evenness of the surface of the molded article was also satisfactory. The molding conditions and the results derived therefrom are shown in Table 2.

Table 2

|  | Example 2 | Comparative example 2 | Reference example 3 |
|---|---|---|---|
| Resin | PP | PP | PP |
| Expansion agent | Chemical Expansion agent | Chemical Expansion agent | Chemical Expansion agent |
| Expansion agent Pressure (MPa) | — | — | — |
| Gas Pressure in Cavity (MPa) | 0.2 | 0.0 | 0.9 |
| Timing of Gas Discharging | Completion of Injection | Completion of Injection | Completion of Injection |
| Resin Charge Thickness (mm) | 1.5 | 1.5 | 1.5 |
| Product Thickness (mm) | 2.5 | 2.5 | 2.5 |
| Evenness | Even | Even | Uneven |
| Swirl Mark | Absent | Present | Absent |

Comparative Example 2

When injection molding was carried out without application of gas pressure into the cavity (gas pressure in the cavity=0 MPa), evenness was achieved in the surface of the molded article, but swirl marks occurred in the surface. The molding conditions and the results derived therefrom are shown in Table 2.

Reference Example 3

Injection molding was performed in the same manner as Example 2 except that the gas pressure in the cavity was increased up to 0.9 MPa. Some pockmarks and defective expansion were formed in the surface of the expansion molded article because the cavity pressure was higher than a preferable range. It, however, was confirmed that there were no swirl marks. The molding conditions and the results derived therefrom are shown in Table 2.

| Explanation of reference numerals | |
|---|---|
| 1 | Fixed Mold |
| 2 | Movable Mold |
| 3 | Cavity |
| 4 | Shear Edge |
| 5 | Gas Passageway |
| 5a | Gas passageway |
| 6 | Sealing Member |
| 7 | Valve |
| 8 | Insert |
| 9 | Slide Core |
| 10 | Thermoplastic Resin |
| 11 | O-Ring |

The invention claimed is:

1. An expansion injection molding process comprising charging a thermoplastic resin which has been plasticated and which contains expanding gas dissolved therein into a cavity defined by a fixed mold and a movable mold, and then moving the movable mold to enlarge the volume of the cavity to obtain expanded resin molded article, wherein the movable mold is moved toward the fixed mold, whereby a sealing member arranged on at least one of a pair of facing surfaces facing each other outside the cavity of the fixed mold and movable mold is brought into contact with the other facing surface or a sealing member arranged thereon, the sealing member arranged on one of the pair of facing surfaces does not slide against a surface of the other facing surface or a sealing member arranged on the other facing surface during the movement of the movable mold, whereby the cavity is brought into a gas-sealed state;

thereafter, the movable mold is moved further toward the fixed mold while the sealing member is compressed, whereby the volume of the cavity is reduced while the gas-sealed state is maintained, whereby the gas pressure in the cavity is increased to a pressure higher than the atmospheric pressure;

thermoplastic resin is injected into the cavity in which the gas pressure has been increased, wherein when the thermoplastic resin is injected into the cavity in which the gas pressure has been increased, the gas pressure in the cavity is not further substantially increased by draining the gas in the cavity through a gas passageway;

during or after the injection of the thermoplastic resin into the cavity, the gas pressure in the cavity is released; and thereafter, the movable mold is moved apart from the fixed mold, whereby the cavity volume is enlarged, whereby the thermoplastic resin in the cavity is expanded.

2. The expansion injection molding process according to claim 1, wherein a fixed mold and a movable mold are used which has a shear edge structure such that a concave part and a convex part are engaged together to form therein a cavity and the concave part and the convex part are caused to slide at an fitting portion to change the volume of the cavity.

3. The expansion injection molding process according to claim 2, wherein after the sealing member arranged on at least one of the pair of facing surfaces and the other facing surface or the sealing member arranged thereon are brought into contact together, a gas is supplied into the cavity through a gas passageway interconnecting a gap between a gas-sealed part sealed by the sealing member and the fitting portion of the shear edge structure, whereby the pressure in the cavity space is increased.

4. The expansion injection molding process according to claim 2, wherein during or after the injection of the thermoplastic resin into the cavity space in which the pressure has been increased to the pressure higher than the atmospheric pressure, the gas pressure in the cavity space is released by discharging the gas in the cavity through a gas passageway interconnecting a gap between a gas-sealed part sealed with the sealing member and the fitting portion of the shear edge structure.

5. The expansion injection molding process according to claim 1, wherein a chemical expansion agent is used as the expansion agent for the thermoplastic resin, and the movable mold is moved toward the fixed mold while the sealing member is compressed, whereby the gas pressure in the cavity is increased to 0.05 MPa or higher.

6. The expansion injection molding process according to claim 1, wherein a physical expansion agent is used as the expansion agent for the thermoplastic resin, and the movable mold is moved toward the fixed mold while the sealing member is compressed, whereby the gas pressure in the cavity is increased to a pressure as high as 5% or more of the supply pressure of the physical expansion agent.

7. The expansion injection molding process according to claim 1, wherein the cavity is brought into the gas-sealed state by bringing the sealing member having a circular or semicircular cross section into contact with the other sealing member having a plane shape.

8. The expansion injection molding process according to claim 1, wherein the cavity is brought into the gas-sealed state by bringing the sealing member in a round shape into contact with the other sealing member in an angular shape.

9. The expansion injection molding process according to claim 1, wherein the sealing pressure increases with mold closure.

10. An expansion injection molding process comprising charging a thermoplastic resin which has been plasticated and which contains expanding gas dissolved therein into a cavity defined by a fixed mold and a movable mold, and then moving the movable mold to enlarge the volume of the cavity to obtain expanded resin molded article, wherein the movable mold is moved toward the fixed mold, whereby a sealing member provided on at least one of a pair of facing surfaces facing each other outside the cavity of the fixed mold and movable mold is brought into contact with the other facing surface or a sealing member arranged thereon with reducing a distance between the sealing member provided on at least the one of the pair of facing surfaces facing each other and the other facing surface or the sealing member arranged thereon, whereby the cavity is brought into a gas-sealed state;

thereafter, the movable mold is moved further toward the fixed mold while the sealing member is compressed, the sealing pressure increasing with mold closure;

thermoplastic resin is injected into the cavity in which the gas pressure has been increased, wherein when the thermoplastic resin is injected into the cavity in which the gas pressure has been increased, the gas pressure in the cavity is not further substantially increased by draining the gas in the cavity through a gas passageway;

during or after the injection of the thermoplastic resin into the cavity, the gas pressure in the cavity is released; and thereafter, the movable mold is moved apart from the fixed mold, whereby the cavity volume is enlarged, whereby the thermoplastic resin in the cavity is expanded.

11. The expansion injection molding process according to claim 10, wherein the sealing member arranged on one of the pair of facing surfaces does not slide against a surface of the other facing surface or a sealing member arranged on the other facing surface during the movement of the movable mold.

12. The expansion injection molding process according to claim 10, wherein the fixed mold and the movable mold have a shear edge structure such that a concave part and a convex part are engaged together to form a cavity therein, and the concave part and the convex part are caused to slide at an fitting portion to change the volume of the cavity.

13. The expansion injection molding process according to claim 12, wherein after the sealing member arranged on at least one of the pair of facing surfaces and the other facing surface or the sealing member arranged thereon are brought into contact together, a gas is supplied into the cavity through a gas passageway interconnecting a gap between a gas-sealed part sealed by the sealing member and the fitting portion of the shear edge structure, whereby the pressure in the cavity space is increased.

14. An expansion injection molding process comprising charging a thermoplastic resin which has been plasticated and which contains expanding gas dissolved therein into a cavity defined by a fixed mold and a movable mold, and then moving the movable mold to enlarge the volume of the cavity to obtain expanded resin molded article, wherein the movable mold is moved toward the fixed mold, whereby a sealing member arranged on at least one of a pair of facing surfaces facing each other outside the cavity of the fixed mold and movable mold is brought into contact with the other facing surface or a sealing member arranged thereon, the sealing member arranged on one of the pair of facing surfaces does not slide against a surface of the other facing surface or a sealing member arranged on the other facing surface during the movement of the movable mold, whereby the cavity is brought into a gas-sealed state;

a gas is supplied into the cavity, whereby the gas pressure in the cavity is increased;

the movable mold is moved further toward the fixed mold while the sealing member is compressed, whereby the volume of the cavity is reduced while the gas-sealed state is maintained, whereby the gas pressure in the cavity is increased;

thermoplastic resin is injected into the cavity in which the gas pressure has been increased, wherein when the thermoplastic resin is injected into the cavity in which the gas pressure has been increased, the gas pressure in the cavity is not further substantially increased by draining the gas in the cavity through a gas passageway;

during or after the injection of the thermoplastic resin into the cavity, the gas pressure in the cavity is released; and thereafter, the movable mold is moved apart from the fixed mold, whereby the gas cavity volume is enlarged, whereby the thermoplastic resin in the cavity is expanded, wherein the gas pressure in the cavity is released between the time when a stroke of the injection remaining is reduced to 30% of a stroke at the time of charging the thermoplastic resin and the time when the enlarging the gas cavity volume is started.

* * * * *